United States Patent [19]
Linda et al.

[11] 3,761,150
[45] Sept. 25, 1973

[54] AXIAL FLUID-FILM BEARING

[75] Inventors: Josef Linda; Frantisek Rosberg; Jaroslav Marsalek, all of Prague, Czechoslovakia

[73] Assignee: Tos Hostivar narodni podnik, Praha-Hostivar, Czechoslovakia

[22] Filed: Apr. 7, 1971

[21] Appl. No.: 131,880

[30] Foreign Application Priority Data
Apr. 13, 1970   Czechoslovakia.................. 245270

[52] U.S. Cl. .............................................. 308/160
[51] Int. Cl. ........................................... F16c 17/04
[58] Field of Search........................ 308/160, 9, 122

[56] References Cited
UNITED STATES PATENTS
2,822,223   2/1958   Offen................................ 308/168
1,325,459   12/1919   Wingfield........................... 308/160

Primary Examiner—Charles J. Myhre
Assistant Examiner—Frank Susko
Attorney—Richard Low and Murray Schaffer

[57] ABSTRACT

A hydrodynamic axial or thrust bearing for rotating spindles and the like comprising a cylindrical shell surrounding and spaced from the spindle. The spindle is provided with an annular flange fixed to it, which is located between two ring shaped discs supported by the shell. One of the discs is fixed against axial and rotational movement while the other is fixed against rotation but is supported to move axially. The movable disc is provided with resilient means normally biasing it toward the flange. Oil is supplied between the faces of the flange and discs.

12 Claims, 6 Drawing Figures

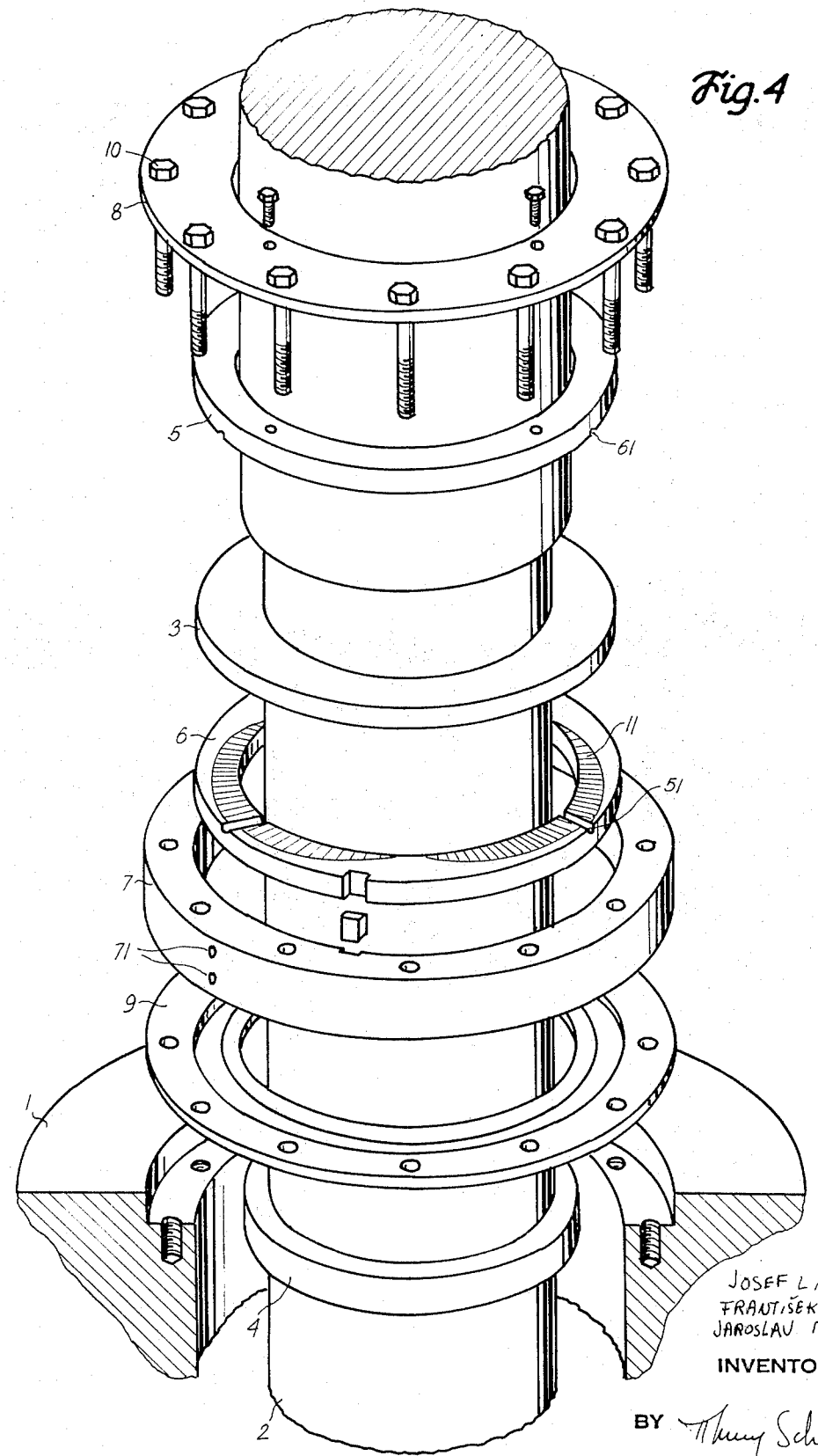

AXIAL FLUID-FILM BEARING

BACKGROUND OF INVENTION

The present invention relates to spindle bearings and in particular, to a hydrodynamic, axial fluid bearing for absorbing thrust loads.

Hydrodynamic thrust bearings have been used for sometime to journal rotating spindle shafts. Such bearings are very effective in journaling high speed shafts; providing accurate location of the shaft, low vibration and extremely low frictional effect even under high loads. Greater attention has been given, however, to the construction of radial journal bearings than to the precise construction of axial thrust bearings. This is a result of the fact that radial journal bearings are more critical than the thrust bearings since the thrust load of a spindle or rotating shaft is not as great as the load radially. However, at the increased speed at which machine tools are now being operated, this problem has become more acute.

Axial hydrodynamic thrust bearings fall into two basic groups depending on their operational function. The first group includes those structures which have fixed non-variable clearances between the relatively rotating parts, in which the fluid bearing film is formed, which clearance does not vary in response to changes in speed of spindle rotation. The second group includes those in which the axial clearance between the same parts is adjusted in dependence on the speed of rotation of the spindle. In either case the bearing film is formed by compressing the fluid in entering wedges or by tilting or pivoting variously arranged bearing segments.

The optimum clearance in bearings of the first group must be achieved by very precise manufacture or by means of complex and difficult adjustment of the parts when assembled. The factors involved in obtaining such optimum arrangement are many and variable, namely; the slide velocity of the spindle and bearing, the inherent resiliency of the parts, bearing capacity, heat generating and manufacturing tolerance. Most important, however, is the skill and experience of the machine operator and assembler of the bearings. If the bearings were adjusted for optimum operation at normal speeds and if the speed of the spindle should suddenly change or extend beyond the projected range, the bearing could not compensate nor could it prevent seizure or other damage to it. On the other hand if the bearings were set for high speeds it would not function efficiently at the lower and more normal speeds.

While the provision of the second group of bearings has largely eliminated the problems of the first group, they too have generated their own drawbacks. Operational elasticity (i.e., adjustability) has been so far achieved by complicated and expensive structural arrangement and the necessity of maintaining very high technical and manufacturing precision. These are serious drawbacks to the wide use of such bearings.

It is an object of the present invention to provide a hydrodynamic thrust bearing which overcomes the drawbacks of the prior art.

It is another object of the present invention to provide a hydrodynamic thrust bearing which is automatically adjustable to varying speeds and spindle loads.

It is another object of the present invention to provide a hydrodynamic thrust bearing which is capable of exerting maximum rigidity (i.e., elastic limits) under varying loads conditions.

It is another object of the present invention to provide a hydrodynamic thrust bearing which is simple in design, which does not require high manufacturing tolerances and which is inexpensive.

These objects as well as others together with numerous advantages will be apparent from the following disclosure of the present invention.

SUMMARY OF INVENTION

According to the present invention a hydrodynamic axial or thrust bearing for rotating spindles and the like is provided comprising a cylindrical shell surrounding and spaced from the spindle. The spindle is provided with an annular flange fixed to it, which is located between two ring shaped discs supported by the shell. One of the discs is fixed against axial and rotational movement while the other is fixed against rotation but is supported to move axially. The movable disc is provided with resilient means normally biasing it toward the flange. Oil is supplied between the faces of the flange and discs. When the spindle begins to rotate an oil film is formed between the faces and the bearing assumes a balanced condition wherein the films are of the same thickness. However, as the speed of the spindle increases or the load changes, the spindle and flange move axially, sliding the movable disc. A new balanced condition occurs wherein the films between the respective faces are not equal in thickness.

Preferably the resilient member biasing the slidable disc is a spring washer of predetermined spring rate which provides automatic controlled constant and optimum adjustability within a very great range of spindle speeds.

Specific details of the present invention are given in the following description and will be seen from the accompanying drawings.

BRIEF DESCRIPTION OF DRAWINGS

In the accompanying drawings,

FIG. 4 shows schematically a perspective view of a thrust bearing formed in accordance with the present invention.

DESCRIPTION OF INVENTION

Figure 2:
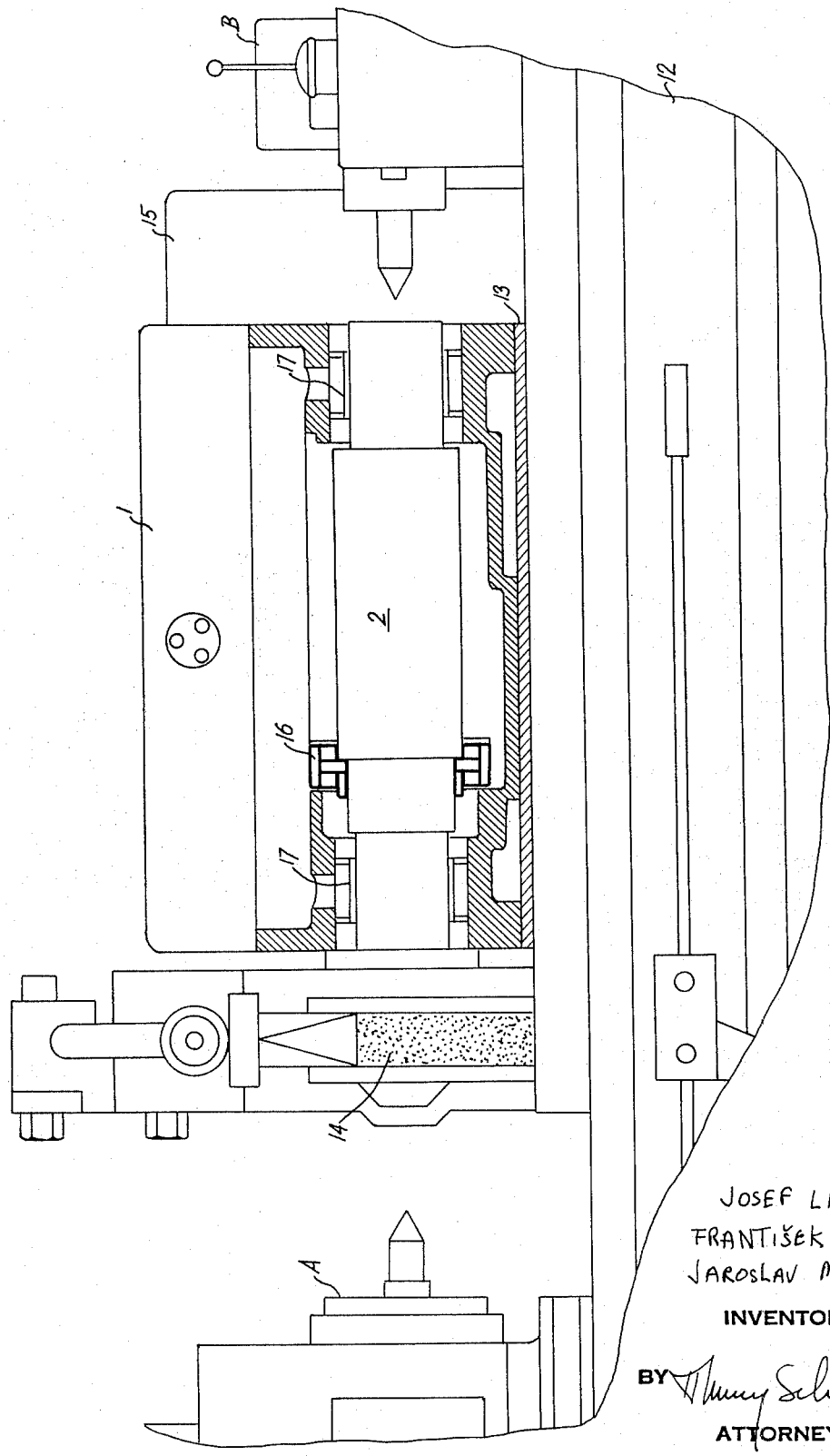
FIG. 2 is an elevational view partially in section of a machine-tool such as a lathe-grinder employing a bearing of the present invention.

For illustration the present invention is described in the form of a thrust or axial slide bearing for the horizontally rotating shaft of a machine tool such as a universal lathe-grinder of conventional type although the application generally to the support of rotating shafts will be obvious. Such machine is seen in FIG. 2 and in addition to the conventional lathe headstock A and tailstock B, it comprises a housing body 1 set back rearwardly from the axis thereof, of the stocks A and B. The housing body 1 rests upon a bed 13 supported by the machine base 12 and journals a shaft or spindle 2 extending parallel to the axis of the headstock and tailstock. A grinder wheel 14 is mounted at the forward and of the spindle 2 while suitable drive means 15, such as, flywheels, gear box, pulley train connected to a motor, or a motor itself, is connected at the rear end. The specific details of such machine are believed to be so well known that further description here is not believed to be necessary.

The spindle 2 is mounted within the housing body 1 by means of a pair of hydrodynamic radial journal bearings 17 located at the forward and rear ends. The spindle 2 is preferably necked in one or more coaxial steps and is provided with the axial or thrust hydrodynamic bearing 16 of the present invention, to prevent axial translation. A preferred form of radial bearings is fully described in the copending application of the same inventor based upon his Czechoslovak patent appliction No. PV 1754-70, filed Mar. 17, 1970.

Figure 1:
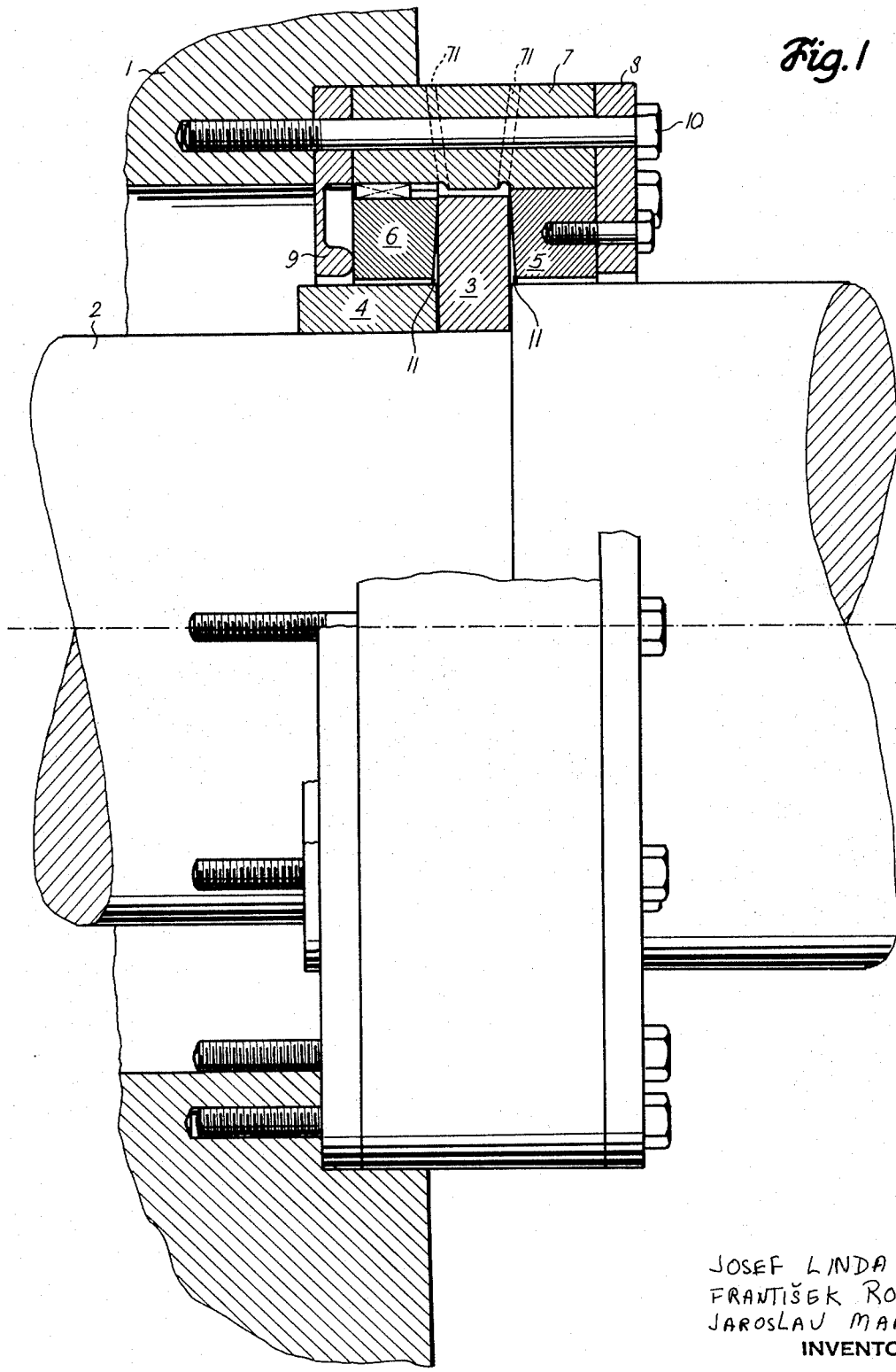
FIG. 1 is an axial cross-section of a thrust bearing formed in accordance with the present invention.

The thrust bearing of the present invention is seen in detail in FIG. 1. While this bearing is seen in partial sectional form it will be understood that it comprises bodies of revolution about the central longitudinal axis of the spindle 2. The bearing comprises a ring shaped annular flange 3 of stainless steel or the like material fixedly mounted for axial and conjoint rotative movement on the spindle 2. The flange 3 is backed by collar 4 hydraulically expanded which is set on the spindle 2 and then, after releasing hydraulic expansion there rigidly fixed to limit the movement of the flange 3 which may also be keyed to the spindle. The flange 3 extends radially from the spindle between a pair of slide rings or discs 5 and 6 which are preferably made of bronze or other similar metal. The discs 5 and 6 are held within an annular surrounding shell 7 by the provision of mating longitudinally extending key and keyways means which permits relative axially movement for at least the disc 6 but, no rotative movement. Annular washers forming end retaining members 8 and 9 are provided to hold the discs 5 and 6 from axially moving external of the shell. The washers 8 and 9 are fastened to the shell 7 and simultaneously to the machine tool housing body 1 by an elongated bolt fastener 10 which extends longitudinally through all the members.

The retaining washer 8 holding the front disc 5 (in the direction of the power source) is rigid and unyielding and it therefore fixes the extent of movement of the disc 5. The rear retaining washer 9 (in the direction of the grinder) however, is resiliently formed with a predetermined rigidity so as to yield to the movement of its associated slide 6 under application of a given pressure. The rear washer 9 is located and compressed in part between the shell 7 and the body 1 but has its inner edge (i.e. that portion adjacent the disc 6) profiled as a free curved Belleville washer to bear against the slide. The rear washer 9 is made from suitable resilient material of predetermined tensile strength and is profiled in a predetermined preselected manner to provide a selected static preloading of a given level of force on the rear face of the slidable disc 6. A degree of rigidity and or biasing pressure suitable and advantageous for the type of use to which the bearing may be put lies within the range of 0.5 to 5K/$_p$micron. Said Belleville washer is made of usual spring steel and its elasticity is determined such that it must fit to the formula $$P_{Do} = c_M(2\delta_o - \delta_i)$$

where
$P_{Do}$ is axial prestressing of a spindle
$\delta_o$ is the thickness of formed oil film
$\delta_i$ is manufacture axial clearance, and
$c_M$ is axial rigidity of a retaining washer 9 (rigidity = ration between a load and caused deformation)

The value $(2\delta_o - \delta_i)$ is for each bearing known, the force $P_{Do}$ must be approximately the same as an outer loading force $P_T$ and it is known too. As consequence of that the value of rigidity $c_M$ (there rigidity = 1/elasticity) can be determined exactly before assembling.

The inner surfaces of the slidable discs 5 and 6 are substantially parallel and each forming a planar functional surface. Each of the surfaces are formed with lubricating grooves 51 and 61 and cells 11 distributing a film of oil between the functional surfaces to provide the fluid film bearing. Each of the surfaces are further provided with beveled portions forming entering wedges by which the fluid may be compressed. Lubricating oil is supplied from a reservoir (not shown) through suitable channels 71 formed in the shell 7 extending in tangential grooves 51 and 61 to the functional surfaces of slide discs 5 and 6.

The cells 11 are formed in the face of the discs 5 and 6 by stressing or deflecting the ring and in that state grinting its surface in planar form. On release of the stress the planar surface takes on a corrugated configuration and the cells 11 are formed. The final corrugated form of discs 5 and 6 surfaces surfaces can be seen together with resulting cells 11 in FIG. 4. Other means may, of course, be used.

In operation of the machine tool the spindle 2 is of course, rotated causing the oil to be compressed in the entering wedges between the interfaces of the flange 3 and the discs 5 and 6 respectively. A film is forced between each of the functioning surfaces to form the actual bearing which stresses the slidable disc 6 and washer 9. Hydrodynamic forces are thus created which cause the bearing to axially extend. Since the front disc 5 is firmly held in fixed position by the washer 8 the dynamic forces generate a pressure vector acting on the resilient washer 9 (actually against its radially curved portion) permitting the movable disc 6 to slide axially with respect to the spindle. This permits the oil films to vary in thickness and corresponding pressure dependent upon the forces exerted by the flange 3. The system tends to maintain a dynamically balanced state, the result of which is to tend to readjust the axial position of the spindle so that the flange 3 is provided with an optimum axial clearance from the opposed faces of the discs 5 and 6. The dynamic balance is obtained by proper dimensioning of the resilient curved (Belleville) portion of the washer 9 by which optimum rigidity is obtained as well as optimum bearing capacity without fear of seizure.

As the speed of the spindle 2 is increased the forces acting on it tend to move it axially and tend to deform the washer 9 still further and in direct response thereto. Thus the disc 6 is shifted still further axially against the resilient washer changing the corresponding pressure and thickness of the films, until a new optimum clearance is obtained. In fact, the increased speed of spindle rotation only acts to more positively insure the existence of an oil film between the relatively rotating parts under sufficient pressure to prevent binding or seizing of the parts. It has been found that operation of the spindle can be optimumly obtained with the range extending from a minimum of 200 RPMs to a maximum of 20,000 RPMs. The provision of the washer 9 which exerts a static biasing or load on the axially movable disc 6 permits and in fact, results in automatic readjustment instantaneously on variation of spindle speed while optimum bearing conditions are maintained.

Figure 3A:
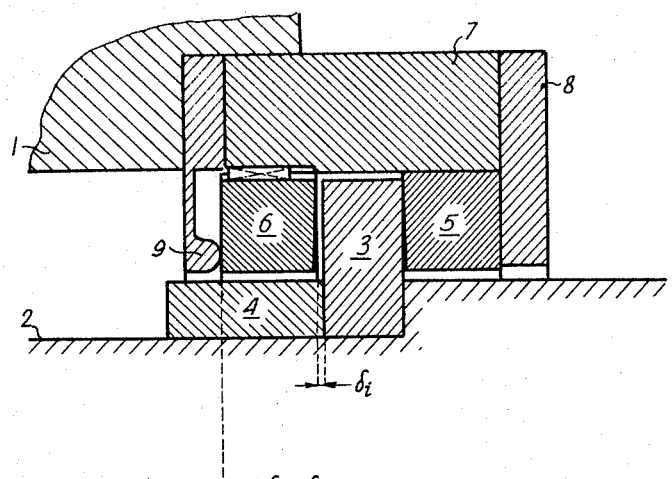
FIG. 3 shows diagrammatically the functioning of the bearing of the present invention in three states, namely, a at rest, b at initial no load rotation of the spindle and c at operational load position.
Figure 3B:
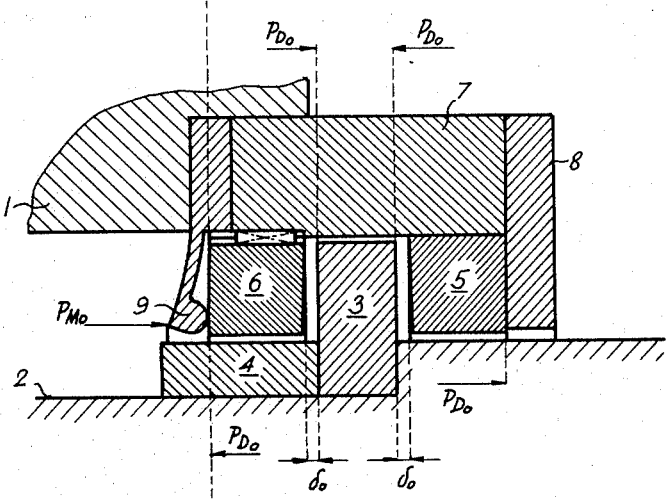
Figure 3C:
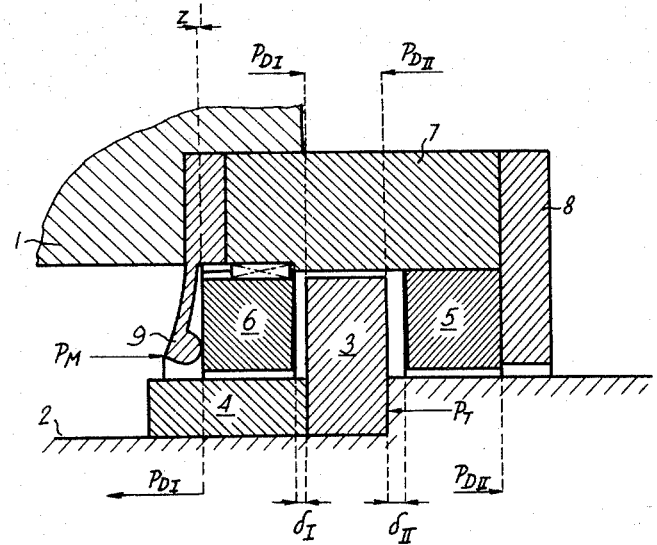

The functioning of the bearing is depicted in the three stages indicated in FIG. 3 which schematically indicates by corresponding numerals the operative elements. In the rest position (i.e., when the spindle is not rotating) as seen in FIG. 3 a the bearing is preadjusted so that an initial axial clearance is formed between the interfaces of the functional surfaces of the disc 6 and the flange 3, when the flange 3 is preloaded or biased against the fixed disc 5. The spindle is, of course, fully seated in its drive means so that any subsequent axial movement will be immediately translated against the movable discs 6. The axial clearance is denoted by the symbol $\delta_i$ and is preferably in the range of between 0 to 10 microns. Little special attention need be made to the structure of the discs or flange since such a range is easily within reasonable manufacturing tolerances for such parts. The preadjustment, of course, is obtained by mounting the bearing and spindle initially to effect the position of the flange 3 flush against the slide disc 5 and seated in its drive means.

As the spindle is rotated, without a load being placed on it, oil becomes interposed between the functional surfaces (of flange 3 and discs 5 and 6 respectively) and a fluid film is formed. The speed of the spindle causes it to axially shift away from the drive means. This places a new prestressing on the movable discs 6 and the resilient washer 9 moving them toward the work piece. The spindle moves a distance e while the discs 6 and washer 9 are caused to move twice that distance or Z due to the creation of film $\delta_o$ between each of the interfaces of flange 3 and discs 5 and 6. In the absence of external loading of the spindle the film between the flange 3 and each of the discs 5 and 6 is equal in thickness and in pressure. The thickness being denoted by $\delta_o$ the pressure by $P_{Do}$. The generation of this balanced clearance is enabled by the resilient deformation of the retaining washer 9 which permits the flange 3 and movable disc 6 to move axially in response to pressure $P_{Do}$ hydrodynamically produced by the compression and movement of the fluid (oil) molecules between the functional surfaces. The hydrodynamic force developed during the rotation of the spindle without external load, as seen in FIG. 3 b, can be calculated by the following equation:

$$P_{Do} = (2\delta_o - \delta_i) \cdot C_M$$

where:

$2\delta_o - \delta_i$ is the distance the resilient washer 9 will flex, and $C_M$ denotes the rigidity of the resilient washer 9.

(As previously noted preferably somewhere in the range of 0.5 to 5 $K_p$/micron.)

The flexing of the washer 9 results in the increase of the spring loading or biasing of the washer 9 on the disc 6 equal to a force $P_{Mo}$ (the deformation force of the washer 9) which to balance the system equals the force $P_{Do}$.

On increasing the speed and applying an operating load on the spindle 2 (i.e., by placing the grinding wheel 14 into work position on a work piece) an external load or force $P_T$ is impressed on the bearing. Said force $P_T$ can act in both axial direction, wherein the direction shown in FIG. 3 is most disadvantageous. The spindle is thereafter shifted into a new balanced position responsive to the external impressed force which creates a new hydrodynamic ratio and balance as seen in FIG. 3 c. The thickness of the original lubricating oil film is further changed by a value Z responsive to the direction of movement or deflection of the spindle 2. In the case shown in FIG. 3 c the spindle moves from right to left under the external load establishing non-uniform films $\delta_1$ and $\delta_{11}$ respectively. As a result of the shift and the change in thickness of the oil film different pressures $P_{D1}$ and $P_{D11}$ are developed between the flange 3 and each of the faces of the discs 6 and 5 respectively. The hydrodynamic forces represented by the pressure vectors $P_{D1}$ and $P_{D11}$ must be in balance with the outer load $P_T$ as well as with the deformation force $P_M$ acting from the resilient washer. Consequently the balanced state of the axial hydrodynamic thrust bearing is expressed as the equation $$P_T = P_{D1} - P_{D11}$$

(2)

however, $$P_{D1} = P_M$$

($P_M$ ($P_{Mo}$) being a force with which a washer 9 acts on a slide disc 6 — it is also an axial prestressing of a bearing — $P_{Mo} = P_{Do}$), but since the deformation of the resilient member under external load condition is the sum of the deformation force vector under no external load ($P_{Mo}$ or $P_{Do}$) plus the change in oil film thickness Z under external load multiplied by the rigidity factor $C_M$ of the washer 9, thus $$P_{D1} = P_M = P_{Do} + Z \cdot C_M$$

(3)

Under external load conditions therefore, the spindle shifts in response to the resultant external force vector maintaining a film of oil between the interfaces of flange 3 and the slide discs 5 and 6 under a bearing pressure responsive thereto, to maintain a balanced condition. The equations mathematically describe the movement or vector of the forces within the bearing of the present invention. They are basic for the calculation of optimum parameters of the bearing structure in order to obtain optimum function. The rigidity of the resilient washer 9, bearing capacity and precision of the parts can all be derived through these formulae.

During continued operation of the grinder-lathe the spindle 2 is subject to varying external load conditions. The varying load conditions are a function of the speed of rotation of the spindle and the external load. As a consequence automatic readjustment of the spindle is continually obtained as a response to all the varying load factors.

It will thus be seen that optimum bearing conditions are continually met by the present invention permitting the operation of the spindle at any speed and even under varying speed conditions. The bearing is provided with a constantly variyble elasticity responsive to the load which permits both low speed and extremely high speed operation. Since a bearing film exists at all times the thickness of which is responsive to the speed, the functional forces between rotating surfaces as well as the temperatures generated are minimal. Thus long operation even under varying loads can be made with minimum danger of damage or seizure. It has been found that sudden variations in a range ratio of minimum to maximum revolution of 1:100 can be easily tolerated with effect on the bearing.

It will be also seen that the relatively moving parts need not be made with great precision and ordinary tolerance are permitted. Thus the device is not only simple and effective but also inexpensive.

Various modifications and changes may be made. Equivalent structural forms and materials may be used. In addition to those given herein, those skilled in the art will recognize other modifications and changes. The disclosure is to be taken as illustrative only, and not limiting of the present invention.

What is claimed:

1. A hydrodynamic thrust bearing for a rotating spindle and the like comprising a cylindrical shell adapted to surround and be spaced from said spindle, and annular flange adapted to be secured to said spindle for conjoint movement therewith and extending towards said shell, a first annular disc, adapted to surround said spindle located on one side of said flange and fixedly supported by said shell, a second, annular disc adapted to surround said spindle and located on the other side of said flange said second disc being slidably supported by said shell for free axial movement relative to said spindle during rotation thereof, means for resiliently biasing said movable disc normally toward said annular flange, and means for supplying bearing fluid between said flange and said discs respectively, said movable disc providing hydrodynamic pressure within said shell during rotation of said spindle.

2. The bearing according to claim 1 wherein the means for supporting said discs by said shell include a washer associated with each of said discs, and fastening means for fixedly mounting said washers to the ends of said shell to retain said discs against axial movement external of said shell.

3. The bearing according to claim 2 wherein said washer associated with said movable disc is at least, in part, resiliently formed and bears forcibly on said disc.

4. The bearing according to claim 3 wherein said resilient washer comprises a Belleville spring.

5. The bearing according to claim 1 wherein said shell and said discs are provided with mating keys and keyways extending along a longitudinal axis thereby securing said discs against rotation.

6. The bearing according to claim 1 wherein the faces of said discs are formed with grooves for distributing bearing fluid and a beveled portion forming an entering wedge between said discs and said flange for said fluid.

7. The bearing according to claim 1 including means for securing said shell against movement to thereby provide a fixed base for said bearing.

8. The bearing according to claim 1 wherein the ratio of axial loading to the caused axial deflection of said resilient biasing means is within the range of 0.5 to 5 $K_p$/micron.

9. The bearing according to claim 1 wherein said movable disc is located on the side of said disc corresponding to the end of said spindle on which external work load is applied.

10. A fluid bearing system for absorbing the thrusting load of a rotatable shaft or the like comprising an annular flange, adapted to be secured to said shaft and located between a first fixed annular disc and a second freely axially movable annular disc each of said discs being adapted to surround said spindle, means axially prestressing said movable disc toward said flange and means supplying fluid to the faces between said flange and disc respectively, to provide a hydrodynamic action within said bearing whereby on rotation of said spindle said discs cause displacement of said fluid and an increase of pressure between said faces to cause said movable disc to distend axially.

11. The system according to claim 10 wherein said movable disc is prestressed under rotating conditions of said spindle with no external load according to the formula $$P_{Do} = (2\delta_o - \delta_i) \cdot C_M$$

where $P_{Do}$ is the prestressing force (hydrodynamical)

$\delta_i$ is the clearance between the flange and the discs under vector static conditions $\delta_o$ is the clearance under rotating conditions and $C_M$ is the rate constant for the rigidity or spring rate of the biasing or prestressing member.

12. The system according to claim 10 wherein under external load conditions the bearing is maintained at hydrodynamic balance according to the following formula $$P_T = P_{D1} - P_{D11}$$

where $P_T$ is the resultant force of the external load, $P_{D1}$ is the force between the face of the flange and the slidable disc, $P_{D11}$ is the force between the face of the flange and the fixed disc, and $$P_{D1} = P_M = P_{Do} + Z \cdot C_M$$

where $P_M$ is the total stressing of the movable member, and $Z$ is the displacement of a slidable disc with rotation under the effect of an outer load.

* * * * *